United States Patent [19]
Brenton et al.

[11] Patent Number: 5,851,577
[45] Date of Patent: Dec. 22, 1998

[54] PROCESSED CHEESE MADE WITH YOGURT

[75] Inventors: Bennett Lee Brenton, Mundelein; Kent Raymond Seger, Chicago, both of Ill.

[73] Assignee: Kraft Foods, Inc., Northfield, Ill.

[21] Appl. No.: 672,584

[22] Filed: Jun. 28, 1996

[51] Int. Cl.$^6$ .................................................. A23C 19/00
[52] U.S. Cl. ............................ 426/582; 426/34; 426/38; 426/580; 426/583
[58] Field of Search .................................. 426/34, 38, 41, 426/580, 582, 583

[56] References Cited

U.S. PATENT DOCUMENTS

| | | | |
|---|---|---|---|
| 3,741,774 | 6/1973 | Burkwall, Jr. | 99/117 |
| 3,806,606 | 4/1974 | Seiden | 426/188 |
| 4,166,142 | 8/1979 | Chang | 426/582 |
| 4,499,116 | 2/1985 | Zwiercan et al. | 426/582 |
| 4,552,774 | 11/1985 | Gronfor | 426/582 |
| 4,568,555 | 2/1986 | Spanier | 426/582 |
| 4,608,265 | 8/1986 | Zwiercan et al. | 426/582 |
| 4,695,475 | 9/1987 | Zwiercan et al. | 426/582 |
| 4,840,806 | 6/1989 | Hyldon et al. | 426/270 |
| 4,847,107 | 7/1989 | Linse-Loefgren | 426/582 |
| 4,937,091 | 6/1990 | Zallie et al. | 426/582 |
| 5,277,926 | 1/1994 | Batz et al. | 426/582 |
| 5,320,860 | 6/1994 | Duval et al. | 426/582 |
| 5,334,398 | 8/1994 | Sueyasu et al. | 426/36 |
| 5,472,718 | 12/1995 | Ijsseldijk et al. | 426/38 |

FOREIGN PATENT DOCUMENTS

| | | |
|---|---|---|
| 1 026 834 | 5/1953 | France . |
| 23 58 414 | 5/1975 | Germany . |
| 33 14 551 C1 | 11/1984 | Germany . |
| 2290937 | 1/1996 | United Kingdom . |

OTHER PUBLICATIONS

A.A. El–Neshawy: "Production of Processed Cheese Food Enriched With Vegetable And Whey Proteins", Food Chemistry, vol. 28, 1988, pp. 245–255.

Toppino, P.M. et al., "Kaseprodukt als Mozarellakase–imitationsprodukt", Milchwissenschaft, vol. 44, (1989) No. 11, p. 721.

DE 03314551C1, European Patent Abstracts, Nov. 1984.

Yamada, T., Patent Abstracts of Japan, abstracting JP 03–39039, Feb. 1991.

Nagai, et al., Patent Abstracts of Japan, abstracting JP 04–135449, May 1992.

*Primary Examiner*—Leslie Wong
*Attorney, Agent, or Firm*—Fitch, Even, Tabin & Flannery

[57] ABSTRACT

The processed cheese product of the present invention contains natural cheese, a dry component selected from the group consisting of whey protein concentrate, non-fat milk solids and mixtures thereof and yogurt. In the method of the invention for making a processed cheese, one or more types of natural cheese are ground to provide a particulate cheese. The particulate cheese is mixed with a dry component selected from the group consisting of whey protein concentrate, non-fat dry milk and mixtures thereof in a blender to provide a cheese mixture. The mixture is transferred to a cooker and the mixture is heated to a first predetermined temperature. Yogurt is added to the heated mixture to provide a processed cheese product. Heating of the product is continued to a second predetermined temperature. The product is then cooled and packaged.

10 Claims, No Drawings

PROCESSED CHEESE MADE WITH YOGURT

FIELD OF THE INVENTION

The present invention is directed to a processed cheese product containing yogurt and its method of manufacture and, more particularly, to a processed cheese product containing yogurt which may have a reduced level of fat and wherein the processed cheese product has the taste, texture and melting properties of conventional processed cheese.

BACKGROUND OF THE INVENTION

Natural cheese is generally made by adding a microorganism to milk which is capable of metabolizing lactose to produce lactic acid and develop acidity. The milk used in preparing natural cheese may be a full-fat milk, having from about 3.3% to about 4.5% milkfat, depending on the variety of cow and the season, partially skimmed milk, having a fat content of from about 1% to about 2.5% milkfat and skim milk containing less than about 0.5% milkfat. The milk is usually set with a milk clotting enzyme, such as rennet, or by developing acidity to the isoelectric point of the protein. The set milk is cut, whey separates and is recovered from the resulting curd. The curd is pressed to provide a cheese block and curing takes place over a period of time under controlled conditions.

Processed cheese is made from one or more varieties of natural cheese, such as cheddar cheese, colby cheese, swiss cheese, washed curd, granular curd cheese, brick cheese, muenster cheese and pasta filata cheese. Processed cheese is made by grinding the natural cheese, combining the particulate cheese with an emulsifying salt and heating it to a temperature sufficient to pasteurize and fluidize the cheese.

There are three general types of processed cheese. These include pasteurized processed cheese, pasteurized process cheese food and pasteurized processed cheese spread. These processed cheese have certain characteristics which are desirable to cheese consumers. They all have a smooth, creamy texture and a slight firmness which is attributable to the presence of at least 20% fat in the processed cheese formulation.

In the United States, Standards of Identity established by the Food and Drug Administration (FDA) apply to processed cheese. Based on the Standards of Identity, the main differences between the types of processed cheese is their moisture and fat content and the use of optional components. Processed cheese can also be made from skim milk curd and will contain less than about 1.5% fat.

Processed cheese has a moisture content of not more than 40% and a fat content of not less than 47%. Optional ingredients for pasteurized processed cheese includes an edible acid, cream, water, salt and spices.

Pasteurized processed cheese food generally may include the optional ingredients of pasteurized processed cheese plus other optional ingredients which may include additional dairy ingredients, such as milk, skim milk, whey, buttermilk, skim milk cheese and albumen. It has a much lower fat content. Pasteurized processed cheese food may have a fat content as low as 23%. The moisture content is not more than 44%.

Pasteurized processed cheese spread may include the optional ingredients of pasteurized processed cheese food and may also include a gum. The fat content of pasteurized processed cheese spread may be as low as 20% and it has a moisture content in a range between 44% and 60%.

Processed cheese is made by grinding or mixing while heating one or more cheeses of the same or two or more varieties. Processed cheese is heated for no less than thirty seconds at no less than 150° F. These cheeses are made in mass quantities. They are cooked by use of a horizontal cooker, sometimes called a laydown cooker, which can hold up to 500 pounds or more of cheese. Often, the processed cheese is then automatically packaged in air tight cartons.

In recent years, there has been a substantial amount of research effort directed to reducing the amount of fat, particularly saturated fats, in foods. In particular, there is great interest in reducing the level of fat in cheese products, such as processed cheese. It would be highly desirable to develop a processed cheese product with low levels of fat, but which retains the body, texture, organoleptic properties and meltability of a pasteurized processed cheese food containing at least 23% dairy fat.

To date, most related efforts have been directed to the use of starch and starch gum combinations to replace the caseinate fraction in cheese and other food products.

U.S. Pat. No. 4,552,774 is directed to a cheese-like product containing up to 10% by weight starch which prevents separation during melting.

U.S. Pat. No. 4,499,116 describes imitation cheese products having up to 80% by weight of the caseinate replaced by modified starches containing 15% to 40% by weight amylose. U.S. Pat. No. 4,608,265 and U.S. Pat. No. 4,695,475 describe imitation cheese products having up to 100% replacement of caseinate by modified starches having an amylose content of at least 40%. U.S. Pat. No. 4,937,091 describes an imitation cheese product where up to 100% of the caseinate fraction may be replaced by partially enzymatically debranched starch (amylopectin), a short chain amylose and amylopectin having the texture, thermoreversibility and emulsification characteristics of caseinates found in imitation cheeses.

U.S. Pat. No. 4,847,107 describes a method of preparing fresh cheese in a finely particulate form where the particles are prevented from sticking together by the addition of starch to milled cheese.

U.S. Pat. No. 4,568,555 is directed to a cheese sauce containing various gums to provide shelf stability without the need for refrigeration.

U.S. Pat. No. 3,806,606 describes a synthetic cheese product containing essentially narrow melting range fats, wheat gluten, egg white and gelatin to provide a cheese with the same texture and eating quality of natural cheese.

U.S. Pat. No. 5,277,926 to Batz, et al. describes a method of making a high moisture, low-fat processed cheese product in which a mixture of particulate skim milk curd, salt and an emulsifying salt is first provided. The mixture is heated with agitation to provide a homogeneous cheese blend. An aqueous wet mix is added to the mixture to provide a high moisture, low-fat cheese blend. The wet mix comprises water, a texture modifying agent selected from the group consisting of maltodextrin, low DE corn syrup solids and mixtures thereof and a milk protein source.

It is an object of the present invention to provide a reduced fat processed cheese product that contains yogurt and has the flavor, texture and melting properties of a full-fat counterpart.

It is a further object of the present invention to provide a method for preparing reduced fat and low-fat cheese products with a distinct flavor which is produced by a method utilizing dairy components. These and other objects of the present invention will become apparent from the following detailed description of the invention.

SUMMARY OF THE INVENTION

The processed cheese product of the present invention contains natural cheese, a dry component selected from the group consisting of whey protein concentrate, non-fat milk solids and mixtures thereof and yogurt. In the method of the invention for making a processed cheese, one or more types of natural cheese are ground to provide a particulate cheese. The particulate cheese is mixed with a dry component selected from the group consisting of whey protein concentrate, non-fat dry milk and mixtures thereof in a blender to provide a cheese mixture. The mixture is transferred to a cooker and the mixture is heated to a first predetermined temperature. Yogurt is added to the heated mixture to provide a processed cheese product. Heating of the product is continued to a second predetermined temperature. The product is then cooled and packaged.

DETAILED DESCRIPTION OF THE INVENTION

A natural cheese useful in preparing the processed cheese of the invention may have a fat content of from less than about 1.5% to about 45%. The natural cheese may be prepared from whole milk, which contains from about 33% to about 45% fat, from partially skimmed milk, which has a fat content of from about 15% to about 30% or may be prepared from skim milk wherein the cheese has less than about 1.5% fat content. The natural cheeses can be combined to produce a processed cheese having a fat level of anywhere in the range of from less than about 1.5% to about 45%.

The natural cheese may be an American-type cheese produced by a cheddar procedure, a washed curd procedure, a stirred curd procedure or a matted curd procedure. The natural cheese can also be produced by a Swiss-type procedure. The natural cheese can be a pasta filata cheese, such as Mozzarella. The pasta filata cheeses can be low moisture, part skim cheeses, particularly low moisture part skim Mozzarella.

In accordance with one process for the manufacture of the skim milk cheese used in the process of the present invention, the skim milk cheese is prepared from a skim milk source which can be selected from skim milk, concentrated skim milk, reconstituted non-fat dry milk or a mixture of any two or more of these with water in a quantity not in excess of that sufficient to reconstitute any concentrated skim milk or non-fat dry milk used to the level of moisture found in whole milk which has had the milk fat separated therefrom, i.e., about 91% moisture. The skim milk source, which may be pasteurized, and which may be warmed is subjected to the action of lactic acid producing bacteria which are either present in the milk or are added thereto. Sufficient rennet or other suitable milk-clotting enzyme is added to the skim milk to set the skim milk to a semi-solid mass. Calcium chloride may also be added in a quantity of not more than 0.02%.

The mass is cut, stirred and heated with continued stirring so as to promote the separation of whey and curd. They whey is drained off and the curd is matted into a cohesive mass. Proteins from the whey may be incorporated into the cheese mass. The mass is cut into slabs which are piled and handled also as to further promote the drainage of whey and the development of acidity. The slabs are then cut into pieces, which may be rinsed by pouring or sprinkling water over them, with free and continuous drainage. The duration of the rinsing is limited so that only the whey on the surface of the curd pieces is removed. The curd is salted, stirred, further drained and pressed into forms. Certain animal or plant enzymes, which are capable of aiding in the curing or development of flavor of the skim milk cheese, may be added during the procedure.

U.S. Pat. No. 4,476,143, U.S. Pat. No. 3,156,568 and U.S. Pat. No. 5,037,659 describe processes for the manufacture of cheese from skim milk. In this connection, the term "skim milk cheese" as used herein is meant a natural cheese prepared from skim milk.

The natural cheese and the dry components are combined in a blender. Prior to being combined, the natural cheese is comminuted to provide particles of natural cheese having a size of from about 1/16th inch to about 1/4 inch. The natural cheese is used in the processed cheese product of the present invention at a level from about 60% to about 80%. The dry component can be selected from the group consisting of whey protein concentrate, non-fat dry milk and mixtures thereof. The whey protein concentrate is used at a level of from about 5% to about 15%. The non-fat dry milk is used at a level of from about 5% to about 15%. All percentages used herein in reference to the components of the processed cheese are by weight of the finished cheese product, unless otherwise specified.

The combination of the natural cheese and the dry component is transferred to suitable apparatus for heating the mixture. Preferably, the heating is effected in a conventional processed cheese laydown cooker wherein heating is effected by steam injection. Heating can be also performed in a jacketed mixer, such as a Groen kettle. The mixture of natural cheese and dry components is heated to a temperature in the range of from about 163° F. to about 175° F. As the mixture is stirred during heating, a homogeneous cheese mass is provided. After reaching a temperature in the range of from about 163° F. to about 175° F., the homogeneous cheese mass is held at that temperature for a period of from about 1 to about 3 minutes. The cheese mass has melted and has a smooth homogeneous appearance.

Yogurt is then added to the heated cheese mass. The yogurt is prepared by a conventional procedure wherein milk is inoculated with yogurt cultures, such as *L. bulgaricus* and *L. cremorous,* followed by incubation at a temperature of from about 100° F. to about 110° F. for a period of from about 5 to about 7 hours. The yogurt can be prepared from skim milk, partially skimmed milk and whole milk. Thus, the yogurt can have a fat content of from less than about 0.5% to about 4.5%. The yogurt is maintained at a temperature of from about 40° F. to about 45° F. prior to addition to the molten cheese mass in the cooker. The yogurt is added at a level of from about 2% to about 20% by weight. After addition of the yogurt, the pH of the cheese is reduced from a pH of from about 5.6 to about 6.0 to a pH in the range of from about 5.4 to about 5.5. Such reduction in pH provides the sharper, sour, tart flavor of the processed cheese of the invention.

After addition of the yogurt, the temperature of the cheese mass is reduced to within the range of from about 140° to about 160° F. Heating is continued to raise the temperature of the processed cheese product to within the range of from about 163° F. to about 173° F. The processed cheese product is held at this elevated temperature for a period of at least 1 minute so as to pasteurize the processed cheese product.

An emulsifying salt, a preservative such as sorbic acid and Vitamin A is also added to the melted cheese mass in the cooker. It is preferred to use sodium citrate at a relatively low level as the emulsifying agent, although other emulsifying salts can be used. The sodium citrate is used at a level of from about 1.0 to about 2.0%. Sorbic acid is typically used at a level of 0.1% to about 0.2%.

The processed cheese is then removed from the laydown cooker and is further processed by conventional methods, such as by cooling on a chill roll and packaging as slices or by direct packaging, while still heated and pourable. The product can also be cooled in blocks or slices for the manufacture of shreds or chunks.

The following example further illustrates various features of the present invention, but is intended to in no way limit the scope of the invention as set forth in the appended claims.

EXAMPLE

This example produces 50 pounds of white American process cheese slices. 2.5 pounds of ground Mozzarella cheese for processing and 6.7 pounds of ground Cheddar cheese for processing are introduced into a ribbon blender and agitated for ten minutes. 0.1 pounds of sorbic acid, 0.002 pounds of Vitamin A, 2.3 pounds of non-fat dry milk and 3 pounds whey protein concentrate are then added and the blend is adjusted to a target moisture content of 41.6% and fat content of 17.7% by the addition of water and anhydrous milk fat.

The mixture is then introduced into a laydown batch cooker together with 0.28 pounds of salt, 1.15 pounds of emulsifier salts, and 2.8 pounds of water and the mixture is heated by steam injection to a temperature of 171°–175° F. for 15 seconds after which 5 pounds of yogurt at a temperature of 42° F. is added to the cooker. Steam injection adds 3.4 pounds of water to the mixture.

The addition of the yogurt caused the mixture in the cooker to cool to 143° F. The mixture is then reheated to a temperature of 163°–168° F. where it is held for 60 seconds before being discharged to the fill hopper of a chill roll slice former for forming the cheese mixture into slices which are cooled in a cooler to 45° F.

What is claimed is:

1. A method for making process cheese comprising grinding one or more types of natural cheese to provide a particulate cheese, mixing said particulate cheese with a dry component selected from the group consisting of whey protein concentrate, non-fat dry milk and mixtures thereof in a blender to provide a cheese mixture, transferring said mixture to a cooker and heating said mixture to a first predetermined temperature in the range of from about 163° F. to about 175° F., adding yogurt having a temperature in the range of from about 40° F. to about 45° F. to said heated mixture to provided a cooled process cheese product having a temperature in the range of from about 140° F. to about 145° F. and heating said product to a second predetermined temperature in the range of from about 163° F. to about 170° F.

2. A method in accordance with claim 1 wherein said yogurt is present in said product at a level of from about 2% to about 20% by weight.

3. A method in accordance with claim 1 wherein said yogurt is made from milk having from about 0.5% to about 4.5% by weight of fat.

4. A method in accordance with claim 1 wherein said natural cheese is present in said product at a level of from about 60% to about 75% by weight.

5. A method in accordance with claim 1 wherein natural cheese is a full fat cheese having from about 35% to about 45% fat by weight.

6. A method in accordance with claim 1 wherein said natural cheese is a reduced fat cheese having from about 15% to 30% fat by weight.

7. A method in accordance with claim 1 wherein said natural cheese is a skim milk cheese and said yogurt is made from skim milk.

8. A method in accordance with claim 1 wherein whey protein concentrate is present in said product at a level of from about 5% to about 15% by weight.

9. A method in accordance with claim 1 wherein non-fat dry milk is present in said product at a level of from about 5% to about 15% by weight.

10. A method in accordance with claim 1 wherein said yogurt is dried yogurt which is added to said particulate cheese in said blender.

* * * * *